(12) United States Patent
Lewinski et al.

(10) Patent No.: US 11,862,950 B2
(45) Date of Patent: *Jan. 2, 2024

(54) CABLE DUCT ASSEMBLY

(71) Applicant: HELLERMANNTYTON CORPORATION, Milwaukee, WI (US)

(72) Inventors: Giovanni Lewinski, Milwaukee, WI (US); Dan Uhler, Wauwatosa, WI (US); Justin Gallion, Milwaukee, WI (US)

(73) Assignee: Aptiv Technologies Limited, St. Michael (BB)

( * ) Notice: Subject to any disclaimer, the term of this patent is extended or adjusted under 35 U.S.C. 154(b) by 1 day.

This patent is subject to a terminal disclaimer.

(21) Appl. No.: 18/146,000

(22) Filed: Dec. 23, 2022

(65) Prior Publication Data

US 2023/0131156 A1    Apr. 27, 2023

Related U.S. Application Data

(63) Continuation of application No. 16/827,283, filed on Mar. 23, 2020, now Pat. No. 11,539,194.

(60) Provisional application No. 62/823,175, filed on Mar. 25, 2019.

(51) Int. Cl.
  *H02G 3/00* (2006.01)
  *H02G 3/04* (2006.01)
(52) U.S. Cl.
  CPC ......... *H02G 3/0437* (2013.01); *H02G 3/0418* (2013.01)

(58) Field of Classification Search
  CPC .................... H02G 3/0437; H02G 3/0418
  See application file for complete search history.

(56) References Cited

U.S. PATENT DOCUMENTS

| | | | |
|---|---|---|---|
| 4,942,271 | A | 7/1990 | Corsi et al. |
| 5,669,106 | A | 9/1997 | Daoud |
| 5,728,976 | A | 3/1998 | Santucci et al. |
| 5,942,729 | A | 8/1999 | Carlson, Jr. et al. |
| 6,084,180 | A | 7/2000 | Debartolo et al. |
| 6,107,576 | A | 8/2000 | Morton et al. |
| 6,198,043 | B1 | 3/2001 | Hoffman |
| 6,333,461 | B1 | 12/2001 | Marcou et al. |

(Continued)

FOREIGN PATENT DOCUMENTS

| | | |
|---|---|---|
| EP | 2091119 | 8/2009 |
| EP | 2110912 | 10/2009 |

(Continued)

OTHER PUBLICATIONS

"Extended European Search Report", EP Application No. 20165613.9, dated Jun. 30, 2020, 7 pages.

(Continued)

*Primary Examiner* — Pete T Lee
(74) *Attorney, Agent, or Firm* — Colby Nipper PLLC

(57) ABSTRACT

A cable duct assembly configured to retain an elongated cable is presented herein. The cable duct assembly includes a cover plate connected to a first sidewall and a second sidewall and a base plate pivotally connected to the first sidewall and the second sidewall. The first sidewall includes first arms that include lobe mechanisms and second arms that include rotation limiting portions.

21 Claims, 11 Drawing Sheets

(56) References Cited

U.S. PATENT DOCUMENTS

| | | | |
|---|---|---|---|
| 6,410,855 | B1 | 6/2002 | Berkowitz et al. |
| 6,437,244 | B1 | 8/2002 | Vandervelde |
| 6,792,877 | B2 | 9/2004 | Gutgsell et al. |
| 6,835,891 | B1 | 12/2004 | Herzog et al. |
| 6,903,265 | B1 | 6/2005 | Vandervelde et al. |
| 6,916,986 | B1 * | 7/2005 | Herzog ............. H02G 3/0418 52/287.1 |
| 7,041,897 | B2 | 5/2006 | Herzog |
| 7,060,901 | B2 | 6/2006 | Herzog et al. |
| 7,113,685 | B2 | 9/2006 | Ferris et al. |
| 7,224,880 | B2 | 5/2007 | Ferris et al. |
| 7,304,240 | B1 | 12/2007 | Gretz |
| 7,326,863 | B2 | 2/2008 | Herzog |
| 7,611,126 | B2 | 11/2009 | Vesa |
| 7,612,300 | B2 | 11/2009 | Owens et al. |
| 7,615,710 | B2 | 11/2009 | Sayres |
| 7,829,797 | B2 | 11/2010 | VanderVelde et al. |
| 8,220,243 | B2 | 7/2012 | Komiya et al. |
| 8,233,763 | B2 * | 7/2012 | Sayres ............. H02G 3/0418 174/101 |
| 8,530,744 | B2 | 9/2013 | Caveney et al. |
| 8,598,456 | B2 | 12/2013 | Carbone et al. |
| 8,807,490 | B2 | 8/2014 | Komiya |
| 10,103,528 | B2 | 10/2018 | Lewinski |
| 2003/0089515 | A1 * | 5/2003 | Federspiel ........... H02G 3/0437 174/480 |
| 2005/0263309 | A1 | 12/2005 | VanderVelde et al. |
| 2009/0032651 | A1 | 2/2009 | Sayres |
| 2015/0214703 | A1 | 7/2015 | Larsen et al. |
| 2020/0313409 | A1 | 10/2020 | Lewinski et al. |

FOREIGN PATENT DOCUMENTS

| | | | |
|---|---|---|---|
| EP | 3264546 | | 1/2018 |
| EP | 3264546 A1 * | 1/2018 | ........... H02G 3/0418 |
| KR | 20100008125 | | 8/2010 |
| WO | 2005043704 | | 5/2005 |
| WO | 2009018421 | | 2/2009 |

OTHER PUBLICATIONS

"Foreign Office Action", EP Application No. 17178535.5, dated Jan. 21, 2021, 8 pages.

"Foreign Office Action", EP Application No. 20165613.9, dated Dec. 16, 2021, 9 pages.

"Non-Final Office Action", U.S. Appl. No. 16/827,283, 13 pages.

"Notice of Allowance", U.S. Appl. No. 16/827,283, dated Aug. 26, 2022, 12 pages.

* cited by examiner

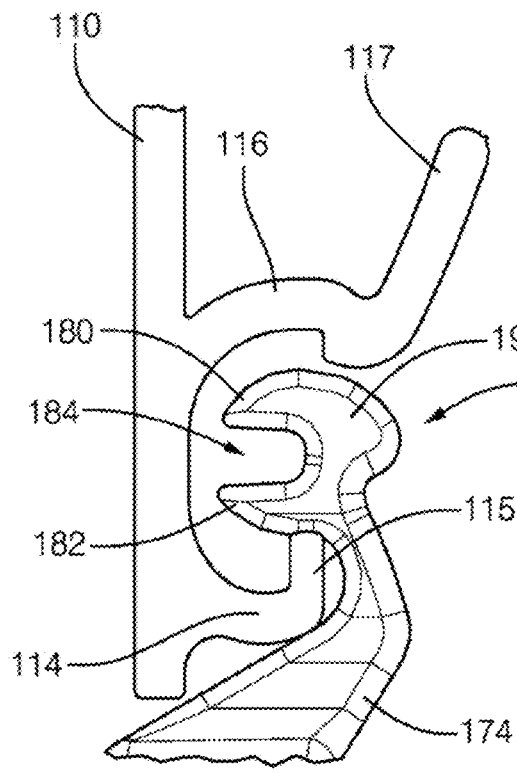
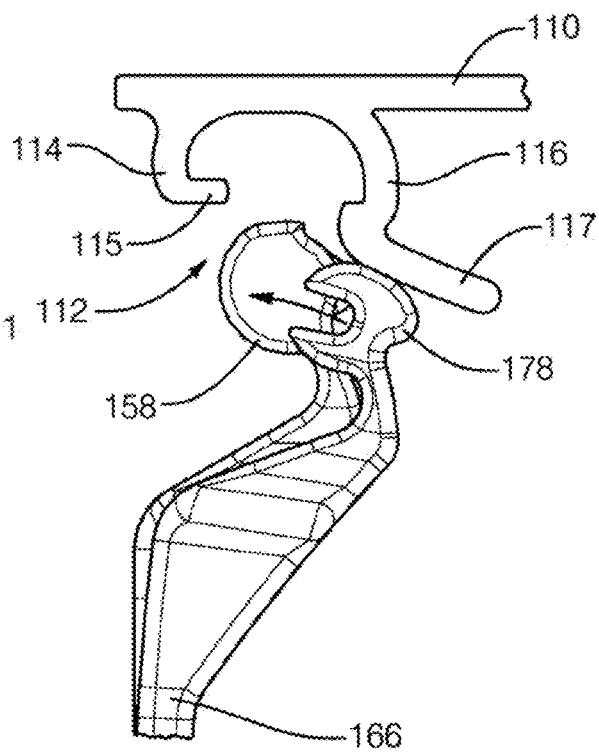
FIG. 5B
FIG. 5C
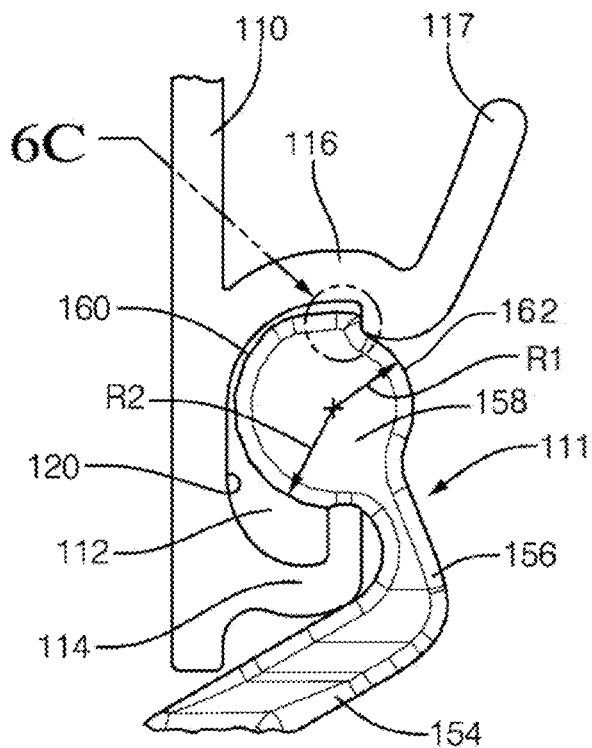
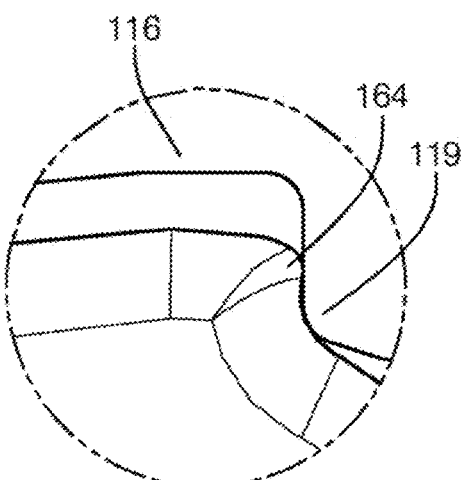
FIG. 6B
FIG. 6C

CABLE DUCT ASSEMBLY

CROSS-REFERENCE TO RELATED APPLICATION

This application is a continuation application of application Ser. No. 16/827,283, filed Mar. 23, 2020, which claimed the benefit under 35 U.S.C. § 119(e) of Application No. 62/823,175 filed on Mar. 25, 2019, the entire disclosures of which are hereby incorporated by reference.

BACKGROUND

The disclosure generally relates to the field of electrical installations, more specifically, electrical conduits, particularly, cable duct assemblies (e.g., cable ducts, modular cable duct assemblies). Cable duct assemblies are used to protect, route, and organize elongated cables, such as fiber optic cables and electrical cables (e.g., power cables, communication cables, conductors), inside electrical panels, electrical cabinets, and other hard-to-reach applications. Some cable duct assemblies include a base plate configured for mounting to a surface, a pair of opposing sidewalls defining a passageway therein, and a cover plate attaching to the sidewalls. The cover plate encloses the passageway.

In some applications, the base of a cable duct assembly is mounted on a non-horizontal surface, such as a vertical wall surface. In such a configuration, the weight of the cables carried in the passageway may act as a load that pushes downwards on the lowermost sidewall of the cable duct assembly, potentially causing the cover plate to disconnect. The disconnection of the cover plate could result in one or more of the cables spilling out of the passageway otherwise provided by the cable duct assembly.

SUMMARY OF THE DISCLOSURE

Techniques and apparatuses are described herein that implement cable duct assemblies and cable duct components, several examples of cable duct assemblies and cable duct components are described herein.

Aspects described below include a cable duct assembly configured to retain an elongated cable. The cable duct assembly includes a cover plate connected to a first sidewall and a second sidewall, and a base plate pivotally connected to the first sidewall and the second sidewall. The first sidewall includes first arms that include lobe mechanisms and second arms that include rotation limiting portions.

Aspects described below include a cable duct assembly that defines a passageway configured to retain an elongated cable. The cable duct assembly includes a cover plate, a base plate, a first sidewall, and a second sidewall. The cover plate defines a first saddle socket spaced apart from, and generally parallel to, a second saddle socket. The base plate is arranged opposite the cover plate. The base plate defines a first sidewall connector. The first sidewall is configured to connect to and between the base plate and the cover plate. The first sidewall includes a first sidewall stem, a plurality of first arms, and a plurality of second arms. The first sidewall stem is configured for receipt into the first sidewall connector. The first arms extend from the first sidewall stem to the first arm ends. The first arm ends include first lobe mechanisms that include first rounded outer lobe portions configured to rotatably engage the first saddle socket and releasably secure the cover plate to the first sidewall. The second arms extend from the first sidewall stem to second arm ends. The second arm ends include first rotation limiters that include first catch portions configured to engage the first saddle socket and limit rotation of the first saddle socket relative to the first rotation limiters. The second sidewall is configured to connect to and between the base plate and the cover plate.

Aspects described below further include a cable duct assembly that defines a passageway configured to retain an elongated cable. The cable duct assembly includes a cover plate, a base plate, a first sidewall, and a second sidewall. The cover plate defines a first saddle socket spaced apart from, and generally parallel to, a second saddle socket. The base plate is arranged opposite the cover plate. The base plate defines a first sidewall connector and a second sidewall connector. The second sidewall connector is spaced apart from, and generally parallel to, the first sidewall connector. The first sidewall is configured to connect to and between the base plate and the cover plate. The first sidewall includes a first sidewall stem, a plurality of first arms, and a plurality of second arms. The first sidewall stem is configured for receipt into the first sidewall connector. The first arms extend from the first sidewall stem to first arm ends. The first arm ends include first lobe mechanisms that include first rounded outer lobe portions configured to rotatably engage the first saddle socket and releasably secure the cover plate to the first sidewall. The second arms extend from the first sidewall stem to second arm ends. The second arm ends include first rotation limiters that include first catch portions configured to engage the first saddle socket and limit rotation of the first saddle socket relative to the first rotation limiters.

The second sidewall is configured to connect to and between the base plate and the cover plate. The second sidewall includes a second sidewall stem, a plurality of third arms, and a plurality of fourth arms. The second sidewall stem is configured for receipt into the second sidewall connector. The third arms extend from the second sidewall stem to third arm ends. The third arm ends include second lobe mechanisms. The second lobe mechanisms include second rounded outer lobe portions configured to rotatably engage the second saddle socket and releasably secure the cover plate to the second sidewall. The fourth arms extend from the second sidewall stem to the fourth arm ends. The fourth arm ends include second rotation limiters. The second rotation limiters include second catch portions configured to engage the second saddle socket and limit rotation of the second saddle socket relative to the second rotation limiters. The first arms and the second arms are arranged in a pattern of alternating positions along a length of the first sidewall stem. The third arms and the fourth arms are arranged in a pattern of alternating positions along a length of the second sidewall stem.

Aspects described below also include a cable duct assembly that defines a passageway configured to retain an elongated cable. The cable duct assembly includes a cover plate, a base plate, a first sidewall, and a second sidewall. The cover plate defines a first saddle socket spaced apart from, and generally parallel to, a second saddle socket. The first saddle socket includes a first flange and a second flange. A first saddle channel is defined between the first flange and the second flange. The second saddle socket includes a third flange and a fourth flange. A second saddle channel is defined between the third flange and the fourth flange. The first flange further includes a first cover hook portion that extends to the first saddle channel. The third flange further includes a second cover hook portion that extends to the second saddle channel. The base plate is arranged opposite the cover plate. The base plate defines a first sidewall connector, and a second sidewall connector is spaced apart from and, generally parallel to, the first sidewall connector.

The first sidewall is configured to connect to and between the base plate and the cover plate. The first sidewall includes a first sidewall stem, a plurality of first arms, and a plurality of second arms. The first sidewall stem is configured for receipt into the first sidewall connector. The first arms extend from the first sidewall stem to first arm ends. The first aim ends include first lobe mechanisms that include first rounded outer lobe portions configured to rotatably engage the first saddle socket and releasably secure the cover plate to the first sidewall. The second arms extend from the first sidewall stem to second arm ends. The second arm ends include first rotation limiters that include first catch portions configured to engage the first saddle socket and limit rotation of the first saddle socket relative to the first rotation limiters.

The second sidewall is configured to connect to and between the base plate and the cover plate. The second sidewall includes a second sidewall stem, a plurality of third arms, and a plurality of fourth arms. The second sidewall stem is configured for receipt into the second sidewall connector. The third arms extend from the second sidewall stem to third arm ends and include second lobe mechanisms. The second lobe mechanisms include second rounded outer lobe portions configured to rotatably engage the second saddle socket and releasably secure the cover plate to the second sidewall. The fourth arms extend from the second sidewall stem to fourth arm ends. The fourth arm ends include second rotation limiters that include second catch portions configured to engage the second saddle socket and limit rotation of the second saddle socket relative to the second rotation limiters.

Further features and advantages of the disclosed cable duct assemblies will appear more clearly on a reading of the following Detailed Description of the disclosed cable duct assemblies, which is given by way of non-limiting example only and with reference to the accompanying drawings.

This summary is provided to introduce simplified concepts of cable duct assemblies, which are further described below in the Detailed Description and Drawings. For ease of description, the disclosure focuses on electrical conduits; however, the techniques and apparatuses described herein are not limited to electrical conduit contexts, but also apply to other environments where elongated objects need protection, routing, and/or organization. This summary is not intended to identify essential features of the claimed subject matter, nor is it intended for use in determining the scope of the claimed subject matter. Additional understandings of the techniques and apparatuses contemplated and/or claimed herein can be gained by reviewing the Detailed Description, presented below, and the referenced drawings.

BRIEF DESCRIPTION OF THE DRAWINGS

The details of one or more aspects of cable duct assemblies and components thereof are described in this document with reference to the following drawings. The same numbers are used throughout the drawings to reference like features and components:

FIG. 5B is a partial, front elevation view of the cable duct assembly of FIG. 5A;

FIG. 5C is a partial, front elevation view of the cable duct assembly of FIG. 5A;

FIG. 6B is a partial, front elevation view of the cable duct assembly of FIG. 6A;

FIG. 6C is a partial, front elevation view of the cable duct assembly of FIG. 6B;

DETAILED DESCRIPTION

The details of one or more aspects of cable duct assemblies and cable duct assembly components are described in this disclosure. Cable duct assemblies and cable duct assembly components made in accordance with this disclosure have particular application in open environments, electrical cabinets, and electrical panels to protect, route, and organize cables, particularly in applications that are in hard-to-reach or confined spaces in which the cables require protecting.

Figure 6A:
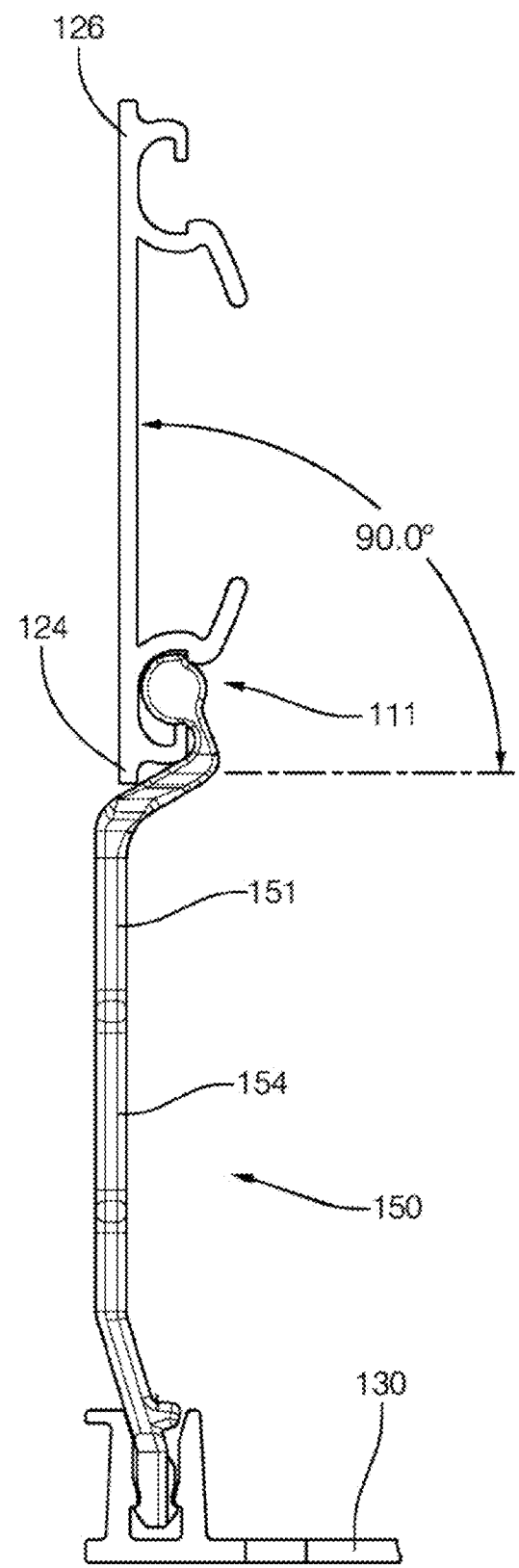
FIG. 6A is a partial, front elevation view of the cable duct assembly of FIG. 1A, illustrating the cable duct assembly in a cover-open configuration, illustrating an end arm removed.
Figure 7A:
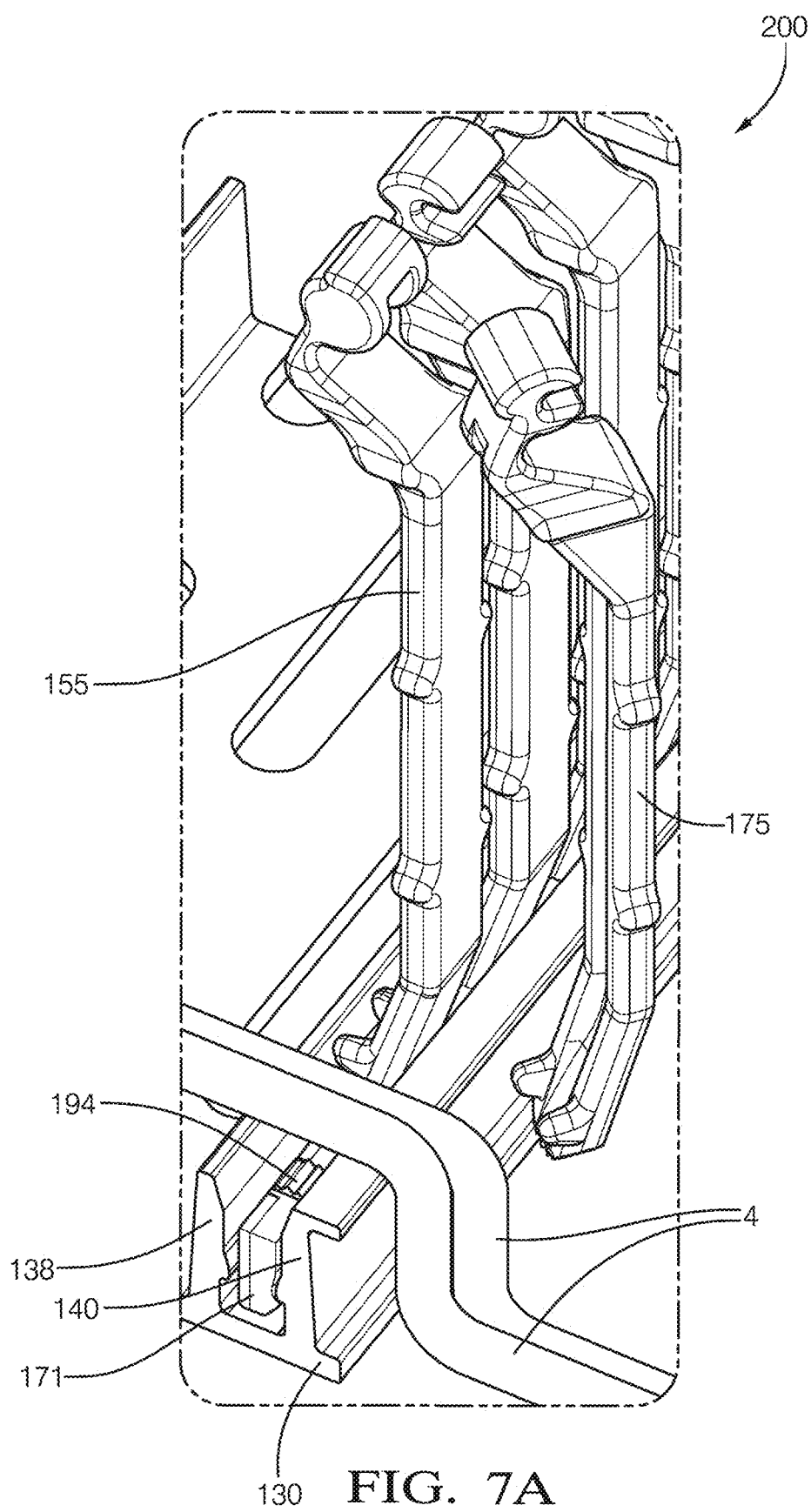
FIG. 7A is a partial, perspective view of a second cable duct assembly.
Figure 7B:
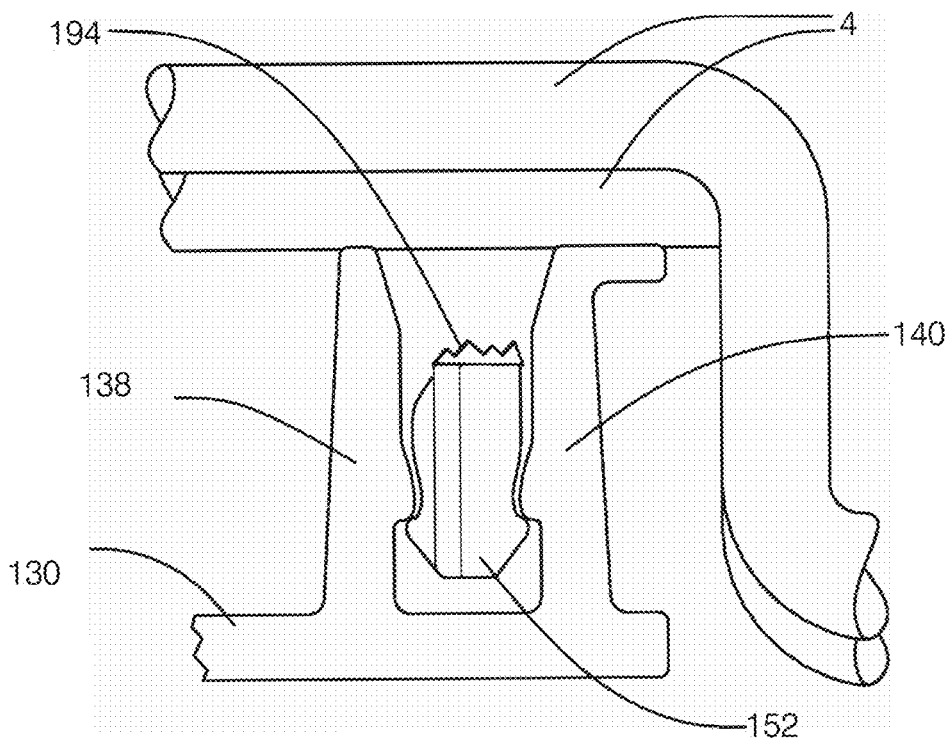
FIG. 7B is a partial, front elevation view of the cable duct assembly of FIG. 7A.

A first cable duct assembly 100 is illustrated in FIGS. 1A-6C, a second cable duct assembly 200 is illustrated in FIGS. 7A and 7B, and a third cable duct assembly 300 is illustrated in FIGS. 8A, 8B, 8C, 8D, and 9. These Figures illustrate a cable duct assembly that includes a cover plate arranged opposite a base plate and a pair of sidewalls arranged opposite one another. For example, FIGS. 1A-6C illustrate a cable duct assembly 100, which includes a cover plate 110 arranged opposite a base plate 130 and a pair of sidewalls 150 arranged opposite one another (e.g., a first sidewall 151 arranged opposite a second sidewall 172).

The base plate 130 forms the base of the cable duct assembly 100. The base plate 130 may define at least one sidewall connector (e.g., sidewall connector 132, sidewall connector 142) that is configured for connecting with a sidewall 150 (e.g., first sidewall 151, second sidewall 172). For example, in the first cable duct assembly 100, a first sidewall connector 132 and a second sidewall connector 142 are illustrated, where the first sidewall connector 132 is spaced apart from and generally parallel to the second sidewall connector 142. In the first cable duct assembly 100, the first sidewall connector 132 engages with (e.g., snaps into) the first sidewall 151, and the second sidewall connector 142 engages with the second sidewall 172.

Figure 2B:
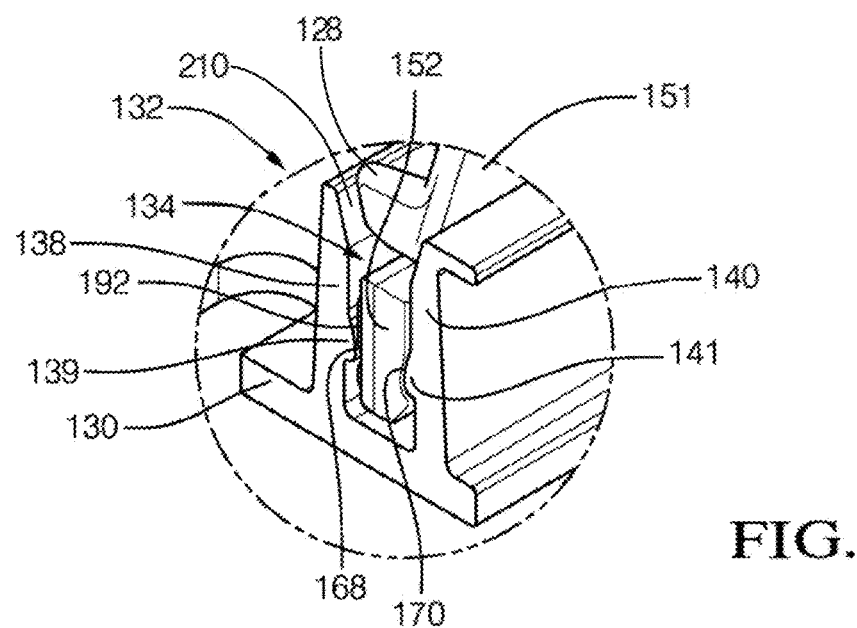
FIG. 2B is a partial, perspective view of the cable duct assembly of FIG. 1A.

The sidewall connector may include an inner base rail 138, 144 spaced apart from an outer base rail 140, 146 to define an open-ended locking channel that is configured for receiving a sidewall stem of a sidewall therein. For example, as illustrated in FIG. 2B, the sidewall connector 132 may include an inner base rail 138 spaced apart from an outer base rail 140 to define an open-ended locking channel 134 that is configured for receiving the sidewall stem 152 of a sidewall 151 therein. As illustrated in FIG. 2B, the inner base rail 138 may include an inner locking flange 139 that extends into the locking channel 134, and the outer base rail 140 may include an outer locking flange 141 that extends into the locking channel 134.

The base plate 130 may include a base extension 148, 149 that extends past the distal side of the sidewall connector (e.g., first sidewall connector 132, second sidewall connector 142). The base extension 148, 149 stiffens the outer base rail (e.g., outer base rail 140, outer base rail 146) in relation to the base plate 130, thereby preventing the outer base rail from rotating about the edge of the base plate 130. For example, in FIG. 8D, the load on the sidewall 150 results in the outside of the sidewall stem 152 and/or the outside of the lower portion of the sidewall 150 contacting and applying a force to the outer base rail 140 that is translated (transferred) to the base extension 148 and to the connected surface 8. During such a situation, while the outside locking recess 170 may move out of engagement with the outer locking flange 141, the inside locking recess 168 remains engaged with the inner locking flange 139 and the sidewall stem 152 is retained within the locking channel 134, that results in the maintenance of the connection between the sidewall stem 152 and the sidewall connector 132.

Figure 4:
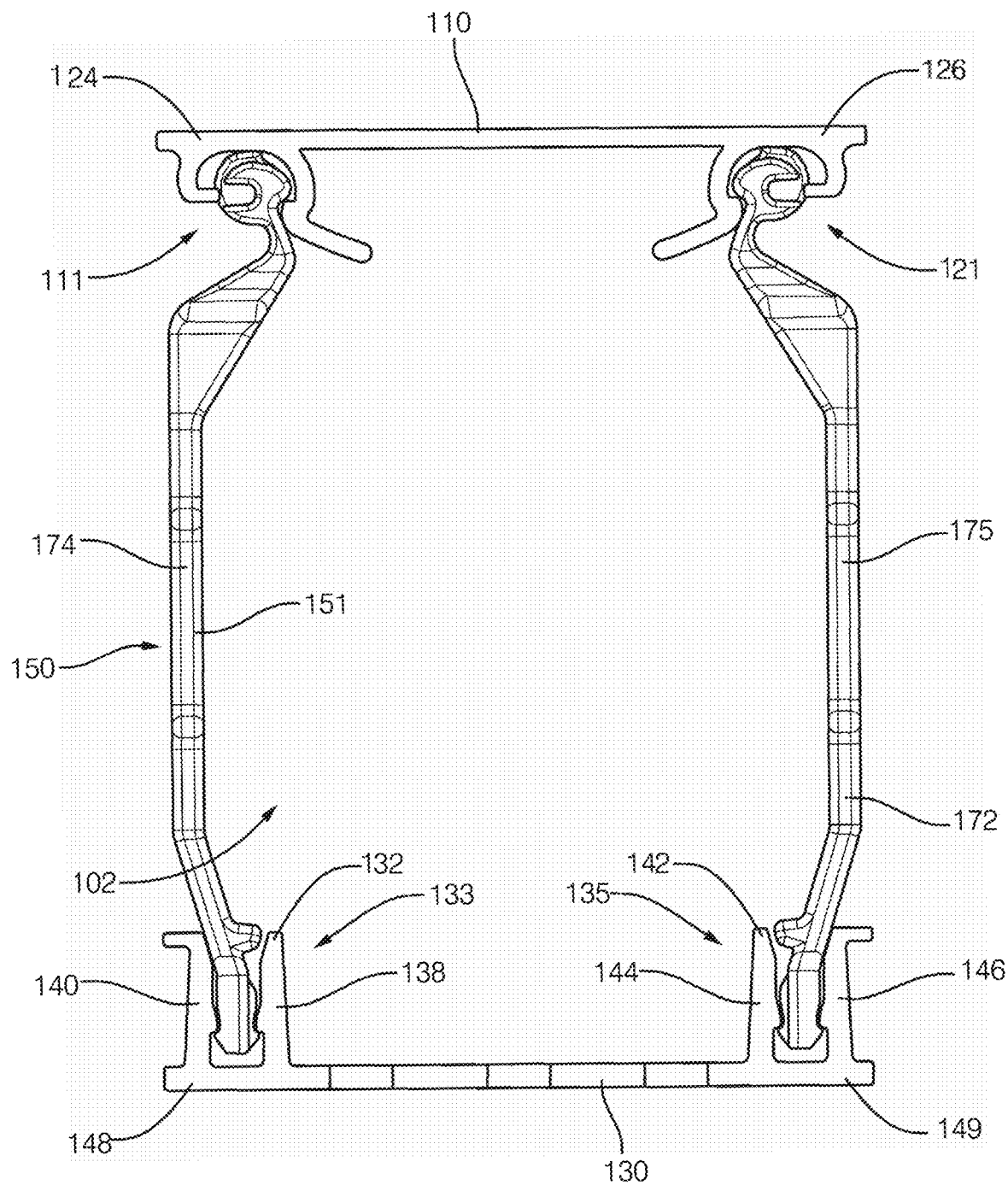
FIG. 4 is a front elevation view of the cable duct assembly of FIG. 1A, illustrating the cable duct assembly in a cover-closed configuration.

The cable duct assembly 100 may include one or more pivot connections (e.g., first pivot connection 133, second pivot connection 135) that pivotally connect a sidewall to a respective sidewall connector. For example, as illustrated in FIGS. 4 and 8A, through the interaction between the sidewall stem (e.g., sidewall stem 152) inserted into the sidewall connector (e.g., first sidewall connector 132), the inside locking recess 168 receives the inner locking flange and the outside locking recess 170 receives the outer locking flange 141, as illustrated in FIG. 2B, and the sidewall is able to pivot at its attachment with the base plate 130, as illustrated in FIG. 8B.

Figure 8A:
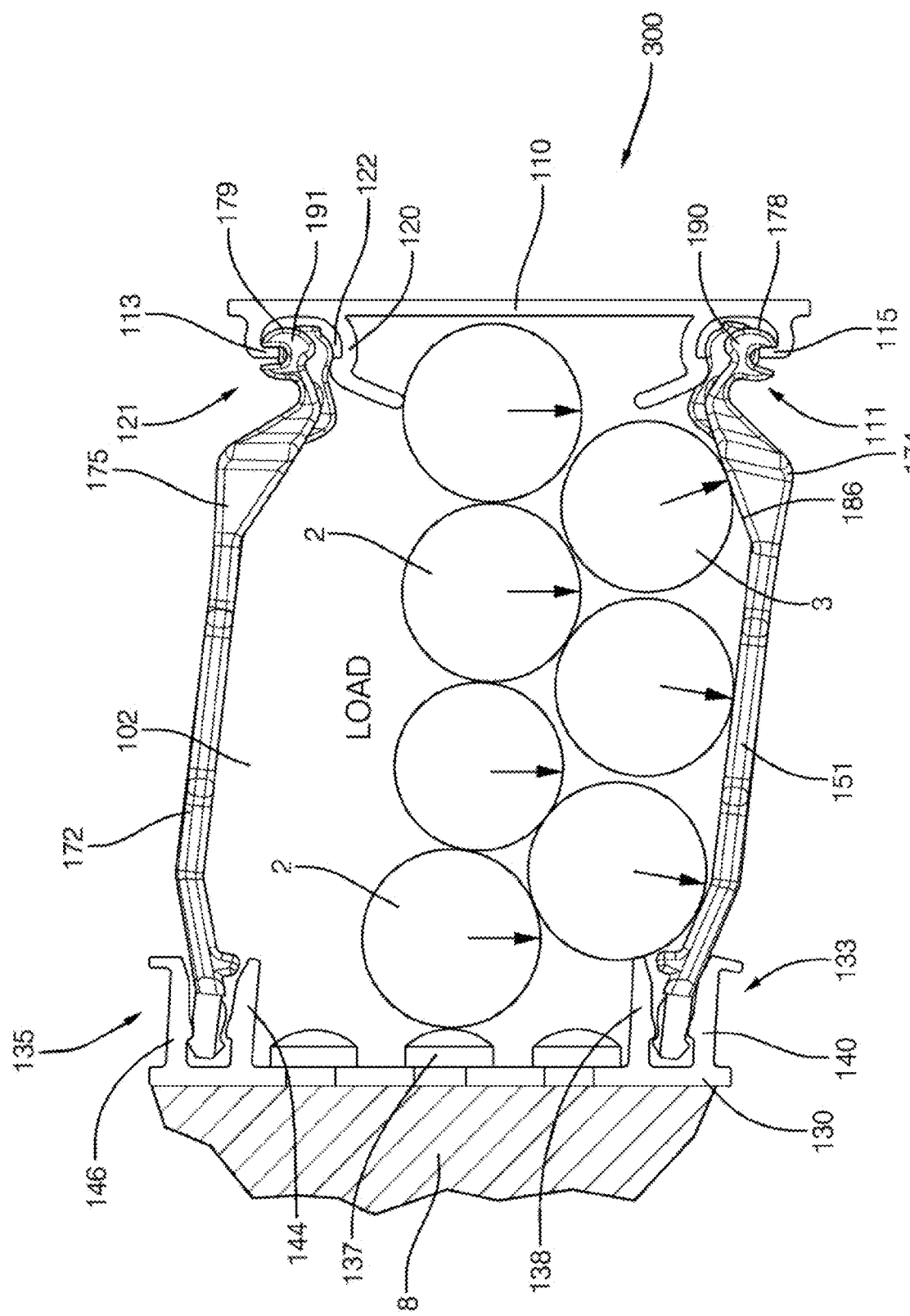
FIG. 8A is a front elevation view of a third cable duct assembly, illustrating a plurality of cables carried in the passageway of the cable duct assembly.
Figure 8B:
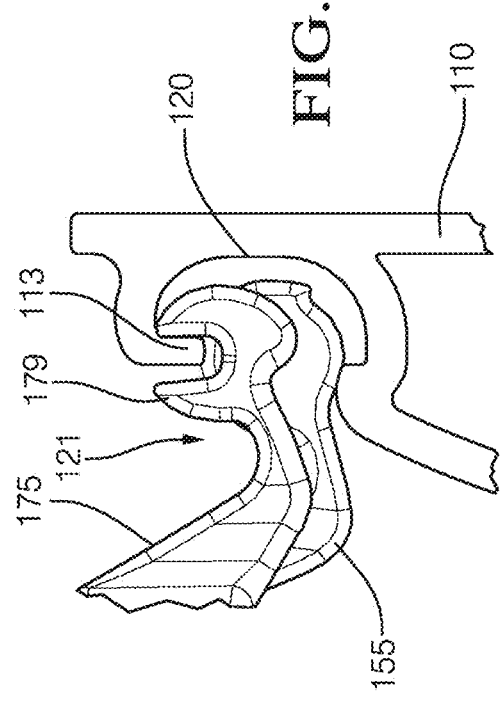
FIG. 8B is a partial, front elevation view of the cable duct assembly of FIG. 8A.

As a result of the load exerted on the lower sidewall, illustrated in FIG. 8A, the cable duct assembly 300 moves as a four-bar linkage, with rotation at the first hinge mechanism 111 and the second hinge mechanism, and that pivots at the first pivot connection 133 and the second pivot connection 135. As illustrated in FIG. 8D, the load on the first and second arms of the sidewall 151 may cause rotation of the first pivot connection 133, which brings the snap reinforcement 192 into contact with the inner locking flange 139, thereby locking the sidewall stem 152 within the sidewall connector 132 of the base plate 130.

The base plate 130 is configured for attaching to a surface 8, as illustrated in FIG. 8A. While FIG. 8A illustrates a vertical wall surface, in other aspects the surface may be differently oriented. In FIG. 8A, a plurality of fasteners 137 are inserted through slots 136 (illustrated in FIG. 2A) to attach the base plate 130 to the surface 8.

Figure 2A:
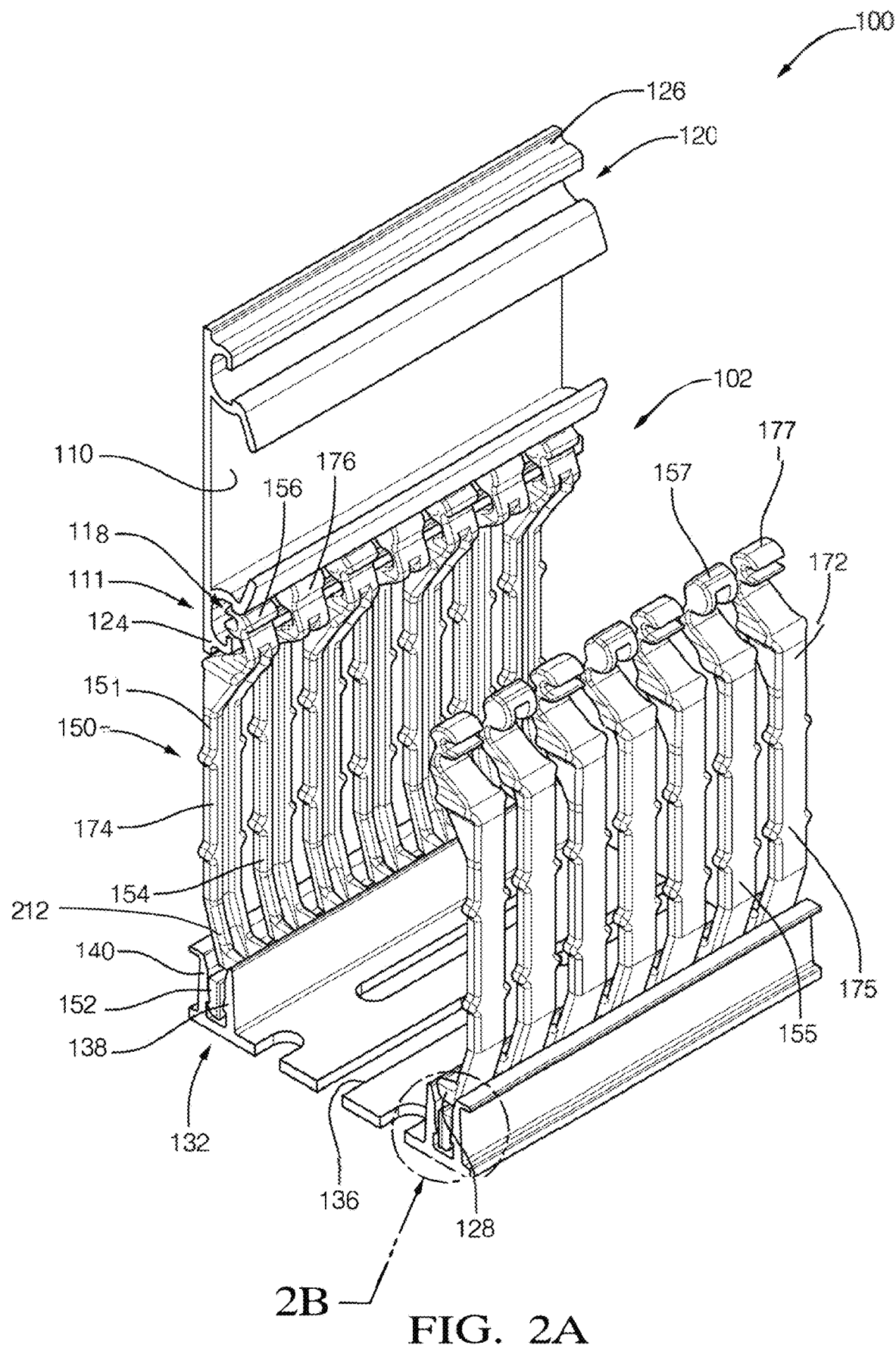
FIG. 2A is a perspective view of the cable duct assembly of FIG. 1A.

The cable duct assembly 100 further includes a plurality of sidewalls 150 arranged opposite one another (e.g., a first sidewall 151 arranged opposite a second sidewall 172), as illustrated in FIG. 2A. The sidewalls 150 are configured to connect between the base plate 130 and the cover plate 110. When connected with the base plate 130, the sidewalls 150 define a passageway 102 that is configured for receiving one or more elongated objects, such as cables 2, therein.

Figure 1A:
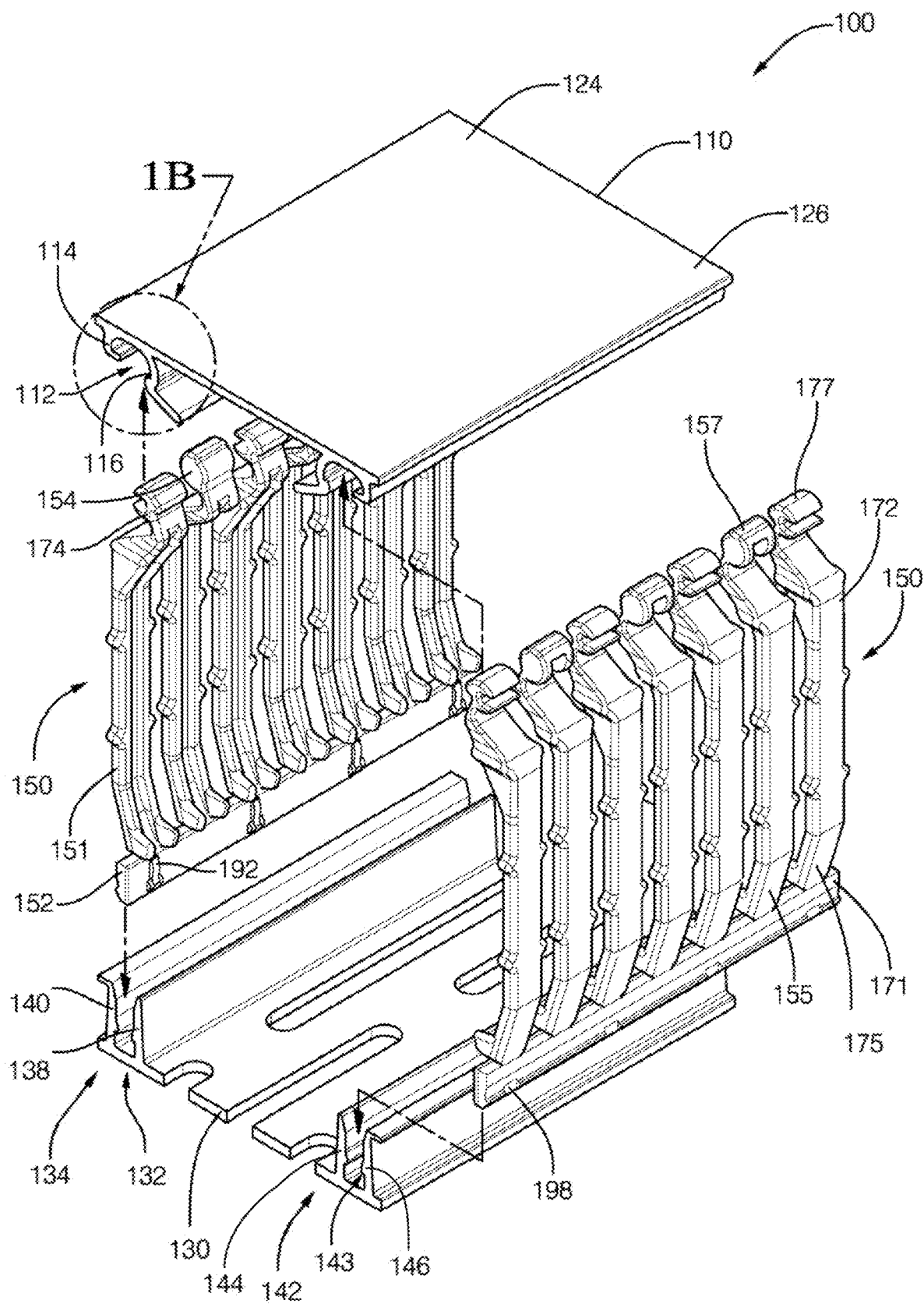
FIG. 1A is an exploded, perspective view of a first cable duct assembly.
Figure 3:
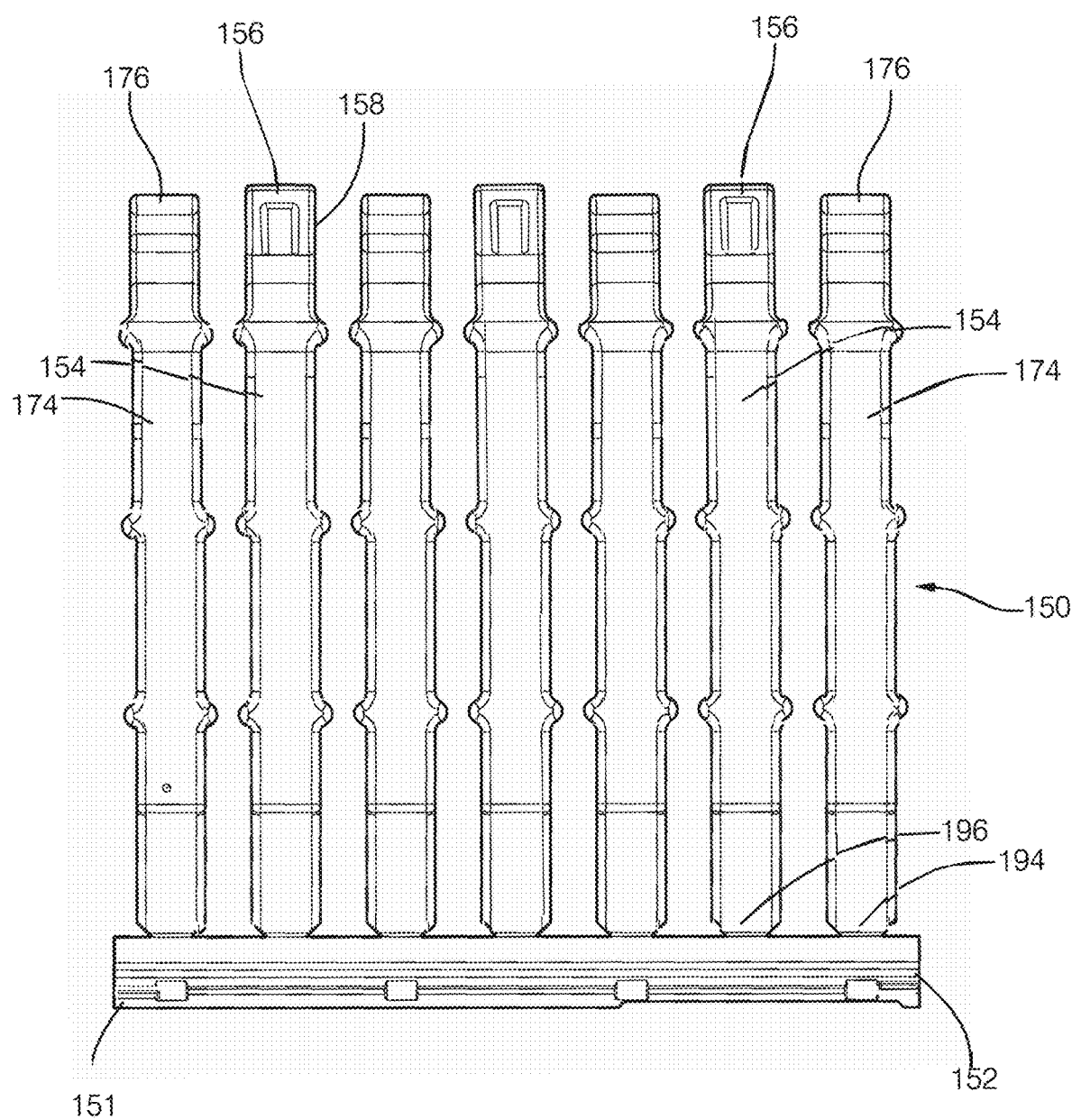
FIG. 3 is a left side elevation view of a sidewall component for a cable duct assembly.

FIG. 1A illustrates a pair of sidewalls 150 (e.g., first sidewall 151, a second sidewall 172) and FIG. 3 is a side view of a sidewall 150 of a cable duct assembly 100. In configurations, the sidewall 150 connects the base plate 130 to the cover plate 110 and is located between the base plate 130 and the cover plate 110. A sidewall 150 may include a sidewall stem that is configured for connecting with a base plate 130 at a sidewall connector (e.g., first sidewall connector 132, second sidewall connector 142) and at least one arm. A sidewall 150 may include at least one first arm (e.g., first arm 154, first arm 155) and at least one second arm (e.g., second arm 174, second arm 175).

The sidewall stem (e.g., sidewall stem 152, sidewall stem 171) may include a distal end that is configured for receipt into a locking channel (e.g., locking channel 134 of a first sidewall connector 132, locking channel 143 of a second sidewall connector 142). At least one arm (e.g., first arm 154, second arm 174) extends from the sidewall stem of the sidewall 150. The sidewall 150 may include at least one first arm and at least one second arm. For example, the first sidewall 151 illustrated in FIG. 1A includes a plurality of first arms 154 and a plurality of second arms 174. A sidewall 150 may include a plurality of first arms and a plurality of second arms that are arranged in a pattern of alternating positions along a length of the sidewall stem, such as is illustrated in FIGS. 1A, 2A, and 3. In other aspects, at least one of the sidewalls 150 may include any combination and order of first arms 154 and second arms 174 along a length of the sidewall stem. The second sidewall 172 may include a plurality of first arms and a plurality of second arms, as is illustrated in FIG. 1. The second sidewall 172 may include a plurality of first arms and a plurality of second arms that are arranged in a pattern of alternating positions along a length of the sidewall stem 171, such as is illustrated in FIG. 1. The first arms and second arms may be positioned in any combination and/or order along the length of the sidewall stem 171.

While in aspects, the first sidewall 151 and the second sidewall 172 may be configured differently, in the cable duct assembly 100 illustrated in FIGS. 1A, 2A, and 3, the first sidewall 151 and second sidewall 172 are generally identical to one another and, as positioned in the base plate 130, are mirror images of each other. As such, a description of features of the first sidewall 151 can be extended to equivalent features on the second sidewall 172.

The sidewalls 150 are configured for pivotal connection with the base plate 130. The first sidewall 151 may be configured to pivotally connect with the base plate 130 through a first pivot connection 133, and the second sidewall 172 is configured to pivotally connect with the base plate 130 through a second pivot connection 135.

The sidewalls 150 are configured to hingedly connect with the cover plate through hinge mechanisms. The first sidewall 151 may be configured to hingedly connect with the cover plate 110 at a first side 124 through a first hinge mechanism 111, and the second sidewall 172 is configured to hingedly connect with the cover plate 110 at a second side 126 through a second hinge mechanism 121.

As illustrated in FIG. 3, the first arm 154 extends from a top side of the sidewall stem 152 to a first arm end 156. The first arm end 156 may include a lobe mechanism 158 (also illustrated in FIGS. 6A-6C) that is configured for rotational connection with a first saddle channel 112 of the cover plate 110 to form a first hinge mechanism 111. As illustrated in FIGS. 6A-6C, the first lobe mechanism 158 includes a rounded outer lobe portion 160 and a rounded inner lobe portion 162. The rounded outer lobe portion 160 is configured to rotatably engage the first saddle channel 112 and to releasably secure the cover plate 110 to the sidewall 150.

As illustrated in FIG. 6B, the rounded outer lobe portion 160 may include a first radius R2, and the rounded inner lobe portion 162 may include a second radius R1. In aspects, the first radius R2 is greater than the second radius R1. This difference in radii allows, in a first configuration (e.g., the configuration illustrated in FIG. 5C) the rounded outer lobe portion 160 to be inserted into the saddle channel 112 and then permits, in a second configuration, the rounded outer lobe portion 160 to rotatably engage the saddle channel 112.

The first lobe mechanism 158 may further include a detent step 164 (anti-rotation detent) defined intermediate the rounded outer lobe portion 160 and the rounded inner lobe portion 162, as illustrated in FIG. 6B. The detent step 164 is configured to engage a socket projection 119 defined in the second flange 116 of the first saddle channel 112, and thereby prevent over-rotation of the cover plate 110 relative to the first arm 154 beyond an angular limit (e.g., 90°), for example as illustrated in FIG. 6A.

The second arm 174 extends from the top side of the sidewall stem 152 to a second arm end. The second arm 174 may include a rotation limiter 178 that is configured to engage the first saddle channel 112 of the cover plate 110. The rotation limiters 178 may include a catch portion 190, 191 that are free-floating in a first mode and are configured, in a second mode, to engage the first saddle channel 112 and limit rotation of the first saddle channel 112 relative to the rotation limiter 178 and the arm. In aspects, such as is illustrated in FIG. 5B, the rotation limiters 178 are generally C-shaped, having a front jaw 180 and a rear jaw 182. A recess 184 is defined between the front jaw 180 and the rear jaw 182.

The first flange 114 may include a cover hook portion 115 that extends into the saddle socket 118. The front jaw 180 is configured for receipt into the saddle socket 118, and the recess 184 is configured to receive the cover hook portion 115 therein. As a result, the rotation limiter 178 is configured to engage the saddle socket 118 at the cover hook portion 115 to limit the rotation of the first saddle channel 112 relative to the rotation limiter 178 and the arm.

The second arm 174 may also include an inwardly extending deflector portion 186 that extends into the passageway 102. The deflector portion 186 extends into the passageway 102 farther than the inward side 166 of the first arm 154 extends so that when the cable duct assembly 100 is mounted in a horizontal orientation, the deflector portion 186 is configured to receive a load from the cable 2, whereas the first arm 154 does not so contact cable 3.

The arms (e.g., first arm 154, second arm 174) may include a break-off point near the base plate 130 for routing cables 4 through a sidewall 150. FIGS. 3, 7A, and 7B illustrate that at least one of the first arm 154 or the second arm 174 includes break-off points (e.g., score line) at or adjacent the connection between the respective arm and the sidewall stem 152. For example, in FIG. 3, a first arm 154 is illustrated as having a break-off point 194 defined at the connection between the first arm 154 and the sidewall stem 152, and the second arm 174 is illustrated as having a break-off point 196 defined at the connection between the second arm 174 and the sidewall stem 152. In aspects, the break-off points (e.g., break-off point 194, break-off point 196) may include a chamfered neck, for allowing the arm to be easily twisted off and removed from the sidewall stem, and to provide an additional space for cables to run through the sidewall, for example, as illustrated in FIGS. 7A and 7B. When an arm is twisted off in such a fashion when the sidewall 150 is installed on the base plate 130 by insertion of the sidewall stem 152 into the sidewall connector 132, the break-off point is located below the top of inner base rail 138 and outer base rail 140, leaving no material sticking up (e.g., a sharp vestige) above the base rails that could catch on and/or damage cables routed through the sidewall, as illustrated in FIGS. 7A and 7B.

The sidewall 150 may include one or more nodules 128 that extend from an inside surface 212. The nodules 128 are configured for receipt into the upper portion 210 of the sidewall connector (e.g., sidewall connector 132). The nodules 128 are configured to keep the sidewall 150 perpendicular to the base plate 130 (e.g., when horizontally mounted).

As illustrated in FIG. 1A, the sidewall stem 152 may include at least one of a snap reinforcement 192 on a first side of the sidewall stem 152 and a snap cutout 198 on a second side of the sidewall stem 152. During sidewall stem insertion into a sidewall connector, friction may occur between the rails (e.g., inner base rail, outer base rail) of the sidewall connector and the wall stem. In the cable duct assembly 100, the sidewall stem (e.g., sidewall stem 152) is configured to be inserted into the sidewall connector (e.g., first sidewall connector 132) so that the inside locking recess 168 receives the inner locking flange and the outside locking recess 170 receives the outer locking flange 141, as illustrated in FIG. 2B. Through such a configuration, the insertion force required due to friction is minimized due to the small surface contact area.

A sidewall 150 may include at least one snap reinforcement 192 on the first side of the sidewall stem 152 directly opposite a snap cutout 198 on the second side of the sidewall stem 152. FIG. 1A illustrates four snap reinforcements 192 along the sidewall stem 152 and four snap cutouts 198 on the second side of sidewall stem 171. The snap reinforcements and/or snap cutouts help maintain snap strength after multiple sidewall 150 insertions and extractions from a sidewall connector. The snap reinforcement 192 defines an inside locking recess 168, and the opposite side of the sidewall stem 152 defines an outside locking recess 170. The inside locking recess 168 is configured to engage the inner locking flange 139, and the outside locking recess 170 is configured to engage the outer locking flange 141 when the sidewall stem 152 is inserted into the locking channel 134. Such a connection defines the pivot connection (e.g., first pivot connection 133, second pivot connection 135) described herein.

The cover plate 110 is configured to attach to the sidewalls 150 and to enclose the passageway 102, as illustrated in FIG. 4. In such a configuration, one or more objects (e.g., cables 2, 3) are retained within the passageway 102 of the cable duct assembly 100.

As illustrated in FIGS. 1A-6C, the cover plate 110 has a first side 124 and a second side 126. The cover plate 110 may include at least one saddle-shaped hinge feature, hereinafter referred to as the saddle socket, that is configured to engage a sidewall 150 at a sidewall arm end. For example, in the cable duct assembly 100 illustrated in FIG. 2A, the cover plate 110 includes a pair of saddle sockets (e.g., first saddle socket 118, second saddle socket 120). The first saddle socket 118 may extend along an underside of the cover plate 110 is disposed adjacent a first distal edge of the cover plate 110 and the second saddle socket 120 extends along the underside of the cover plate 110 is disposed adjacent a second distal edge of the cover plate 110.

The first saddle socket 118 is configured to engage the first sidewall 151 at a plurality of first arm ends 156 and second arm ends 176, and the second saddle socket 120 is configured to engage the second sidewall 172 at a plurality of first arm ends 157 and second arm ends 177. As is illustrated in FIGS. 1A, 2A, and 4, the saddle sockets (e.g., first saddle socket 118, second saddle socket 120) may generally be identical to one another and, as positioned connected to the cover plate 110, may be mirror images of each other.

Figure 1B:
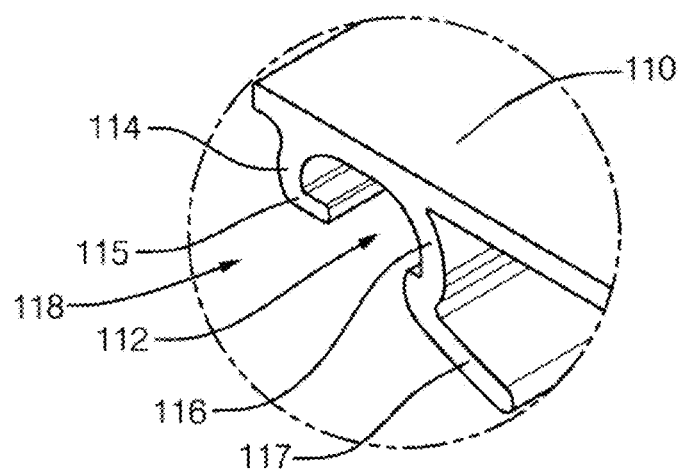
FIG. 1B is a partial, perspective view of the cable duct assembly of FIG. 1A.
Figure 5A:
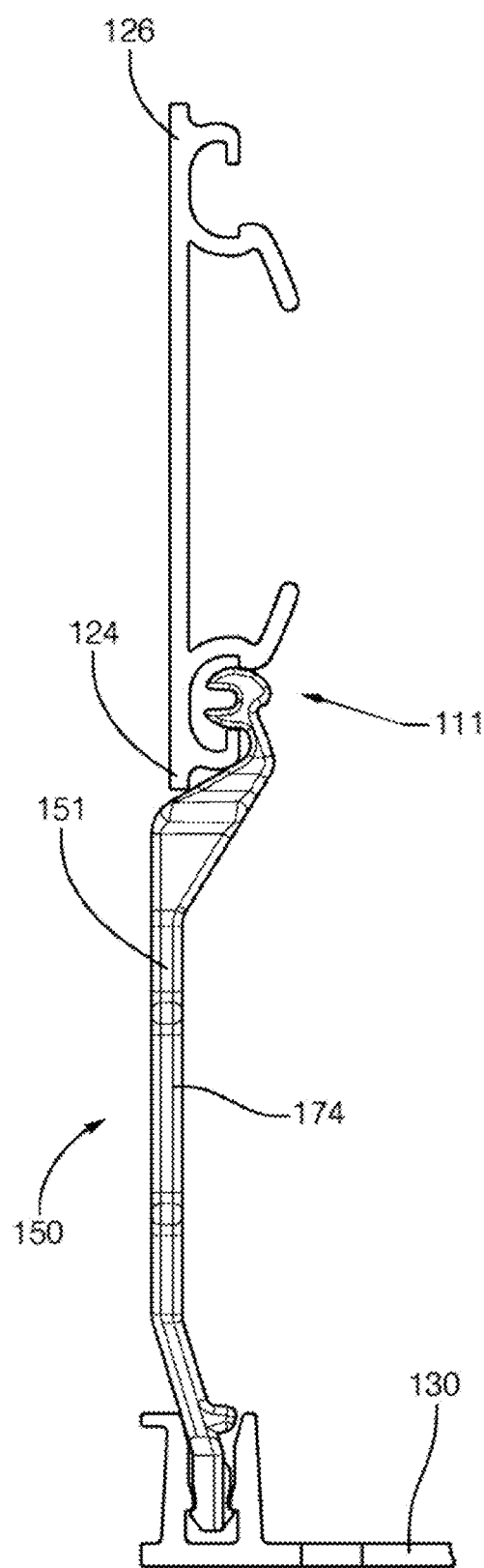
FIG. 5A is a partial, front elevation view of the cable duct assembly of FIG. 1A, illustrating the cable duct assembly in a cover-open configuration.

As illustrated in FIG. 1B, a saddle socket (e.g., saddle socket 118) may include an elongated first flange 114 (first flange 114) and an elongated second flange 116 (second flange 116). An elongated saddle channel 112 is defined between the first flange 114 and the second flange 116. The saddle socket 118 may extend along at least a portion of the length of the cover plate 110, as illustrated in FIG. 1A and FIG. 2A. The first saddle channel 112 may be configured to rotatably receive a plurality of lobe mechanisms 158 of the first arm ends 156, and a plurality of rotation limiting portions (e.g., rotation limiters 178) defined on the second arm ends 176. The lobe mechanism 158 is configured to rotatably engage a saddle socket (e.g., saddle socket 118). The lobe mechanism 158 may be configured so that a portion of the lobe mechanism 158 is received between the first flange 114 and the second flange 116 and into the saddle channel 112. The first saddle channel 112 may be configured to snap into place on the lobe mechanisms 158, and the lobe mechanisms 158 may retain the cover plate 110 on the cable duct assembly 100 when the cable duct assembly 100 is installed on a connected surface 8, such as is illustrated in FIG. 8A. In aspects, the lobe mechanisms 158 allow the cover plate 110 to rotate to 90° (as illustrated in FIG. 5A). As illustrated in FIG. 6B, the second flange 116 may further include a socket projection 119 that is configured to engage the detent step 164, described herein.

The saddle socket 118 may be configured to connect with at least one arm end (e.g., first arm end 156, second arm end 176) of a sidewall 150 to form a hinge mechanism (e.g., hinge mechanism 111, hinge mechanism 121) that pivotally connects the cover plate 110 to a sidewall 150. For example, as illustrated in FIG. 2A and FIG. 4, the saddle socket 118 is configured to receive first arm ends 156 of first arms 154 and second arm ends 176 of second arms 174 of a first sidewall 151 to form a first hinge mechanism 111. The cover plate 110 is configured to rotate relative to a connected first sidewall 151 through the first hinge mechanism 111 when the cover plate 110 is detached from a second sidewall. Likewise, the cover plate 110 is configured to rotate relative to a connected second sidewall 172 through a second hinge mechanism 121 when the cover plate 110 is detached from the first sidewall 151.

The saddle channel 112 may further include a guide ramp 117, for example, that extends from the second flange 116. The guide ramp 117 is configured to align at least one of the lobe mechanism 158 or the rotation limiter 178 for insertion into the saddle channel 112 during the installation of the cover plate onto a first sidewall and/or when closing the cover plate on a second sidewall, as illustrated in FIG. 5C. For example, as the cover plate 110 is brought into connection with the first aim ends 156 of the first arms 154 and second arms 174 of a sidewall 150, the guide ramp 117 guides the lobe mechanism(s) 158 and/or the rotation limiter(s) 178 towards the saddle channel 112, to enable the cover plate 110 to "snap" onto the lobe mechanism(s) 158.

In a cover-closed configuration (illustrated in FIG. 4), the cover plate 110 is hingedly connected, at a first side 124 and a second side 126, to a first sidewall 151 and a second sidewall 172 through a second hinge mechanism 121. In the cover-closed configuration, the first sidewall 151 and the second sidewall 172 are also pivotally connected to the base plate 130 at a first sidewall connector 132 and a second sidewall connector 142. In such a configuration, the cover plate 110 is able to move, relative to the first sidewall 151, second sidewall 172, and the base plate 130, through the hinged and pivot connections, as will be described in greater detail herein. The lobe mechanisms (e.g., lobe mechanism 158) on the arm ends retain the cover plate 110 when the passageway 102 of the cable duct assembly 100 is loaded with objects (e.g., cables 2, 3).

FIG. 2A illustrates a pair of sidewalls 150 (e.g., first sidewall 151, second sidewall 172) connected to the base plate 130, and the cover plate 110 is hingedly connected to a sidewall 150 (e.g., the first sidewall 151) through the first hinge mechanism 111. In such a cover-open configuration (illustrated in FIGS. 2A, 5A, and 6A), the cable duct assembly 100 defines a passageway 102 that is configured to receive one or more cables 2 (illustrated in FIG. 8A) or other objects therein. In the cover-open configuration, the cover plate 110 is configured to rotate about the first saddle channel 112 and/or the second saddle channel 122 to allow access to objects (e.g., cables 2 (illustrated in FIGS. 8A, 8C, and 8D)) stored within the passageway 102.

In the cover-open configuration (illustrated in FIGS. 2A, 5A, and 6A), the cover plate 110 is configured to pivot at the first side 124 about the first sidewall 151, when a second side 126 of the cover plate 110 is detached from the second sidewall 172. For example, FIG. 2A illustrates the first side 124 of the cover plate 110 attached to a first sidewall 151 but detached from a second sidewall 172. In such a configuration, a cable 2 (illustrated in FIG. 8A) or another object can be inserted into the passageway 102 defined through the cable duct assembly 100.

FIG. 2A illustrates a first hinge mechanism 111. FIG. 4 is an end view illustration of the first cable duct assembly 100 that illustrates a pair of sidewalls 150 (e.g., first sidewall 151, second sidewall 172) connected to the base plate 130. In FIG. 4, the cover plate 110 is hingedly connected to the first sidewall 151 through the first hinge mechanism 111, and the cover plate 110 is hingedly connected to the second sidewall 172 through a second hinge mechanism 121. The hinge mechanisms are formed by the hinged connection between a saddle socket and the arm ends of a sidewall. In aspects, such as is illustrated in FIGS. 1A, 2A, and 4, the hinge mechanisms (e.g., first hinge mechanism 111, second hinge mechanism 121) may generally be identical to one another and, as positioned in the cable duct assembly 100, may be mirror images of each other.

The first hinge mechanism 111 may include the first saddle channel 112 of the saddle socket 118, and the second hinge mechanism 121 may include the second saddle channel 122 of the second saddle socket 120. In other aspects, the first saddle channel 112 is spaced apart from and generally parallel to a second saddle channel 122. The first saddle channel 112 may extend along a length of the cover plate 110 adjacent a first side of the cover plate 110 and the second saddle channel 122 may extend along the length of the cover plate 110 adjacent a second side of the cover plate 110. The first saddle channel 112 and the second saddle channel 122 may be substantially identical and symmetrical. The first saddle channel 112 and the second saddle channel 122 may be disposed on opposed distal edges of the cover plate 110.

The first saddle channel 112 may be configured to snap onto a lobe mechanism 158 of a sidewall 150 (e.g., first sidewall 151). A saddle channel (e.g., first saddle channel 112) can be unsnapped from a mating lobe mechanism (e.g., lobe mechanism 158) to allow the opening of the cover plate 110, which permits the cover plate 110 to pivot about the opposing saddle channel (e.g., second saddle channel 122) that remains attached to the other lobe mechanism on the opposing sidewall (e.g., second sidewall 172) when the saddle channel (e.g., first saddle channel 112) is unsnapped. The base plate 130 and the sidewalls 150 may be separate components, or they may be integrally formed. As is illustrated in FIGS. 1A, 2A, and 4, the sidewalls 150 (e.g., first sidewall 151, second sidewall 172) may generally be identical to one another and, as positioned in the base plate 130, may be mirror images of each other.

FIGS. 8A, 8B, 8C, and 8D illustrate a third cable duct assembly 300 horizontally installed onto a connected vertical surface 8 (connected surface 8). In such a configuration, the base plate 130 is attached to the connected surface 8. The cable duct assembly 300 is illustrated as holding a plurality of cables 2, 3. These Figures illustrate the respective load exerted by the cables 2, 3 on the lower sidewall 151, which causes tension between the cover plate 110 and the sidewall 151, causing the catch portions 190 of the rotation limiters 178 on second arms 174 to engage the cover hook portion 115 of the saddle socket 118, mechanically locking the sidewall 151 to the cover plate 110.

In aspects, this action further causes a movement (rotation) of the cover plate 110 relative to the first hinge mechanism 111 and the second hinge mechanism 121. As illustrated in FIG. 8B, the rotation of the cover plate 110 relative to the first hinge mechanism 111 causes the rotation limiter 179 of an upper second arm 175 to move into engagement with the cover hook portion 113 of the second saddle socket 120 and prevents further rotation of the second hinge mechanism 121. As illustrated in FIG. 8D, the load on the first and second arms of the sidewall 151 may cause rotation of the first pivot connection 133 and brings the snap reinforcement 192 into contact with the inner locking flange 139, thereby locking the sidewall stem 152 within the sidewall connector 132 of the base plate 130.

Figure 9:
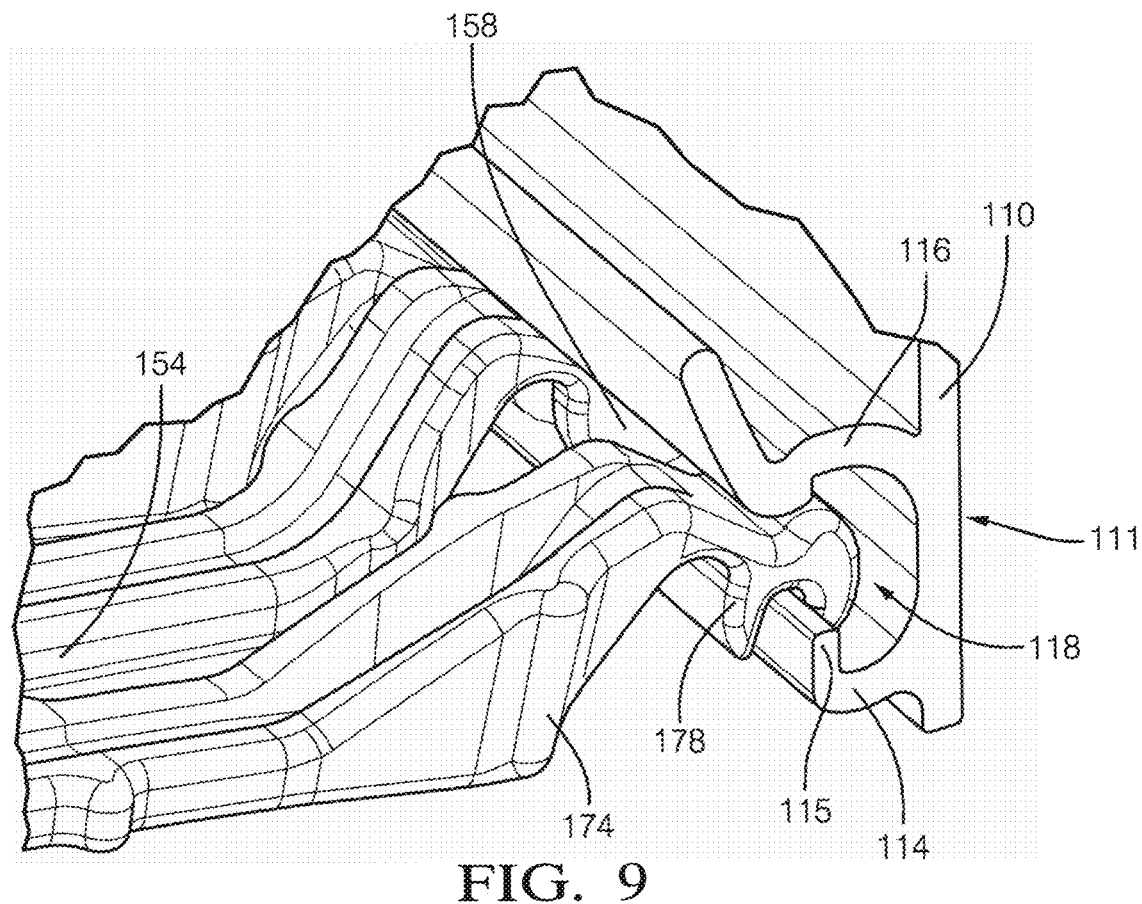
FIG. 9 is a partial, perspective view of the cable duct assembly of FIG. 8A.
Figure 8C:
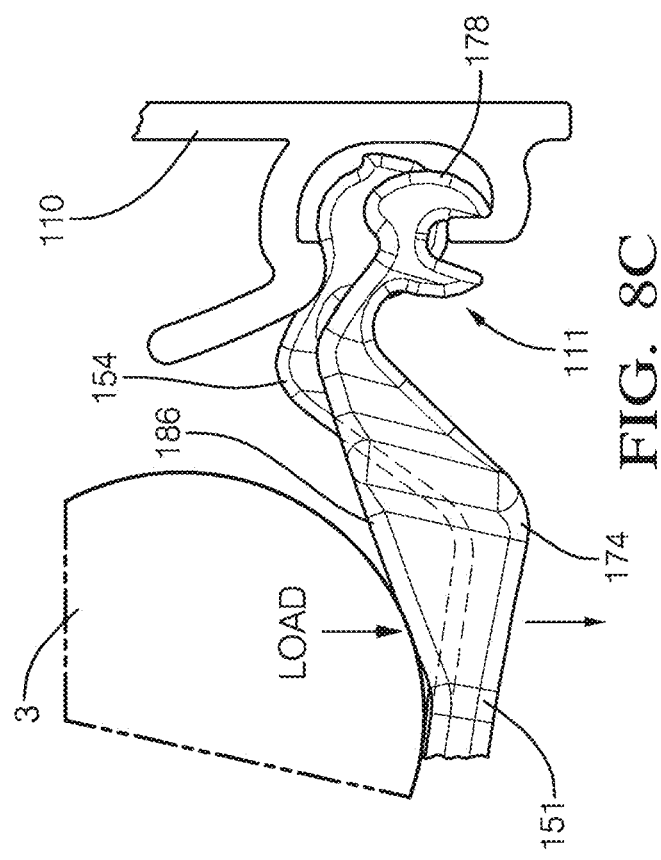
FIG. 8C is a partial, front elevation view of the cable duct assembly of FIG. 8A.
Figure 8D:
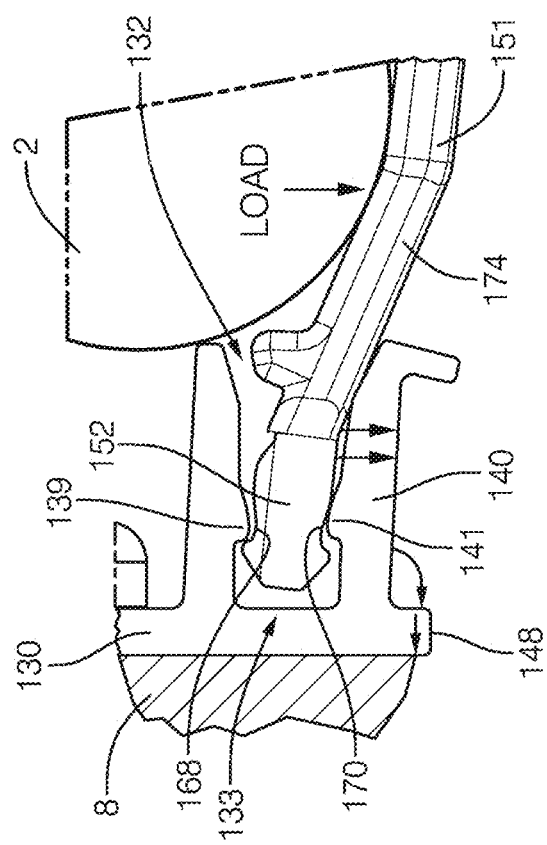
FIG. 8D is a partial, front elevation view of the cable duct assembly of FIG. 8A.

As illustrated in FIG. 8C, one or more of the cables (e.g., cable 3), may bear against the deflector portion 186 of a second arm 174, which causes the rotation limiters 178 to move into engagement with the cover hook portion 115 of the saddle socket 118 (as illustrated in FIG. 9). As a result, the rotation limiter 178 locks onto the cover hook portion 115 and prevents further rotation of the first hinge mechanism 111.

As a result of the load exerted on the lower sidewall 151, the cable duct assembly 300 moves as a four-bar linkage, with rotation at the first hinge mechanism 111 and the second hinge mechanism 121, and pivots at the first pivot connection 133 and the second pivot connection 135. Through such movement, the cable duct assembly 300 is able to handle the load of the cables 2 without the cover plate 110 detaching or without either of the sidewall stems detaching from its respective sidewall connector.

In FIG. 8D, the load on the sidewall 151 may further cause the outside of the sidewall stem 152 and/or the outside of the lower portion of the sidewall 150 to contact and apply a force to the outer base rail 140 that is translated (transferred) to the base extension 148 and to the connected surface 8. During such a situation, while the outside locking recess 170 may move out of engagement with the outer locking flange 141, the inside locking recess 168 remains engaged with the inner locking flange 139 and the sidewall stem 152 is retained within the locking channel 134, that results in the maintenance of the connection between the sidewall stem 152 and the sidewall connector 132 through pivot connection 133.

The foregoing is considered as illustrative only of the principles of cable duct assemblies, including components therefor. Furthermore, since numerous modifications and changes will readily occur to those skilled in the art, it is not desired to limit a cable duct assembly to the exact construction and operation illustrated and described. While the preferred embodiment has been described, the details may be changed without departing from the cable duct assemblies described. The examples presented herein are directed to cable duct assemblies, and components thereof configured to retain electrical wiring. However, other embodiments of the cable duct assembly may be envisioned that are adapted for use with fiber optic cables, pneumatic lines, hydraulic lines, or a combination of any of these. Cable duct assemblies contemplate the assembly of various cooperating components fabricated from molded or extruded resilient materials, such as an elastomeric polymer, preferably polyvinyl chloride (PVC).

Examples

The following are additional examples of cable duct assemblies and components thereof.

Example 1. A cable duct assembly that defines a passageway for retaining an elongated cable. The cable duct assembly includes a cover plate, a base plate, a first sidewall, and a second sidewall. The cover plate defines a first saddle socket spaced apart from and generally parallel to a second saddle socket. The base plate is arranged opposite the cover plate. The base plate defines a first sidewall connector. The first sidewall connects between the base plate and the cover plate. The first sidewall includes a first sidewall stem, a plurality of first arms configured to extend from the first sidewall stem to first arm ends, and a plurality of second arms configured to extend from the first sidewall stem to the second arm ends. The first sidewall stem is configured to be received into the first sidewall connector. The first arm ends include first lobe mechanisms that include first rounded outer lobe portions that rotatably engage the first saddle socket and releasably secure the cover plate to the first sidewall. The second arm ends include first rotation limiters. The first rotation limiters include first catch portions configured to engage the first saddle socket. The first catch portions limit rotation of the first saddle socket relative to the first rotation limiters. The second sidewall connects between the base plate and the cover plate.

Example 2. The cable duct assembly of Example 1, wherein the first arms and the second arms are arranged in a pattern of alternating positions along a length of the first sidewall stem.

Example 3. The cable duct assembly of Example 1, wherein the first arms further include a rounded inner lobe portion. The rounded outer lobe portion includes a first radius and the rounded inner lobe portion includes a second radius. The first radius is greater than the second radius. At least one of the first lobe mechanisms further include a detent step defined intermediate the rounded outer lobe portion and the rounded inner lobe portion, the detent step configured to prevent over-rotation of the cover plate relative to the first arms beyond an angular limit.

Example 4. The cable duct assembly of Example 1, wherein the base plate further defines a second sidewall connector spaced apart from and generally parallel to the first sidewall connector. The second sidewall includes a second sidewall stem, a plurality of third arms configured to extend from the second sidewall stem to third arm ends, and a plurality of fourth arms configured to extend from the second sidewall stem to fourth arm ends. The second sidewall stem is configured to be received into the second sidewall connector. The third arm ends include second lobe mechanisms. The second lobe mechanisms include second rounded outer lobe portions configured to rotatably engage the second saddle socket and that releasably secure the cover plate to the second sidewall. The fourth arm ends include second rotation limiters. The second rotation limiters include second catch portions configured to engage the second saddle socket and limit rotation of the second saddle socket relative to the second rotation limiters.

Example 5. The cable duct assembly of Example 4, that further includes at least one of: the first arms and the second arms alternating along a length of the first sidewall stem; or the third arms and the fourth arms alternating along a length of the second sidewall stem.

Example 6. The cable duct assembly of Example 4, wherein the first rounded outer lobe portion includes a first radius, the first arms further include a rounded inner lobe portion, and the rounded inner lobe portion includes a second radius. At least one of the second lobe mechanisms further include a detent step defined intermediate the rounded outer lobe portion and the rounded inner lobe portion, the detent step configured to prevent over-rotation of the cover plate relative to the third aims beyond an angular limit.

Example 7. The cable duct assembly of Example 1, wherein the first saddle socket includes a first saddle channel between a first flange and a second flange.

Example 8. The cable duct assembly of Example 7, that further includes a guide ramp that extends from the second flange. The guide ramp configured to align at least one of the first arms or second arms for insertion into the first saddle socket.

Example 9. The cable duct assembly of Example 7, wherein the first flange further includes a cover hook portion that extends to the first saddle channel.

Example 10. The cable duct assembly of Example 9, wherein at least one of the first rounded outer lobe portions includes a first radius, wherein the first arms includes a rounded inner lobe portion, and wherein the rounded inner lobe portion includes a second radius. The first radius is greater than the second radius. At least one of the first lobe mechanisms further include a detent step defined intermediate the first rounded outer lobe portion and the rounded inner lobe portion. The detent step is configured to prevent over-rotation of the cover plate relative to the first arms beyond an angular limit. The second flange further includes a socket projection configured to engage the detent step.

Example 11. The cable duct assembly of Example 9, wherein the first rotation limiters are generally C-shaped, the first rotation limiters include a front jaw and a rear jaw, and a recess is defined between the front jaw and the rear jaw. The front jaw is configured for receipt into the first saddle channel with the recess configured to receive the cover hook portion therein. The first rotation limiters are configured to engage the first saddle socket at the cover hook portion to limit rotation of the first saddle socket relative to the first rotation limiters.

Example 12. The cable duct assembly of Example 1, wherein the second arms further include deflector portions configured to extend into the passageway. When the cable duct assembly is mounted in a horizontal orientation, the deflector portions receive a load from the elongated cable and transfer the load to the cover plate.

Example 13. A cable duct assembly that defines a passageway configured to retain an elongated cable. The cable duct assembly includes a cover plate, a base plate, a first sidewall, and a second sidewall. The cover plate defines a first saddle socket spaced apart from and generally parallel to a second saddle socket. The base plate is arranged opposite the cover plate. The base plate defines a first sidewall connector and a second sidewall connector spaced apart from and generally parallel to the first sidewall connector. The first sidewall connects between the base plate and the cover plate. The first sidewall includes a first sidewall stem, a plurality of first arms configured to extend from the first sidewall stem to first arm ends, and a plurality of second arms configured to extend from the first sidewall stem to second arm ends, the second arm ends include first rotation limiters. The first sidewall stem is configured to be received into the first sidewall connector. The first arm ends include first lobe mechanisms. The first lobe mechanisms include first rounded outer lobe portions configured to rotatably engage the first saddle socket and releasably secure the cover plate to the first sidewall. The first rotation limiters include first catch portions configured to engage the first saddle socket and limit rotation of the first saddle socket relative to the first rotation limiters. The second sidewall connects between the base plate and the cover plate. The second sidewall includes a second sidewall stem, a plurality of third arms configured to extend from the second sidewall stem to third arm ends, and a plurality of fourth arms configured to extend from the second sidewall stem to fourth arm ends. The second sidewall stem is configured to be received into the second sidewall connector. The third arm ends include second lobe mechanisms. The second lobe mechanisms include second rounded outer lobe portions configured to rotatably engage the second saddle socket and releasably secure the cover plate to the second sidewall. The fourth arm ends include second rotation limiters. The second rotation limiters include second catch portions configured to engage the second saddle socket and limit rotation of the second saddle socket relative to the second rotation limiters. The first arms and the second arms are arranged in a pattern of alternating positions along a length of the first sidewall stem. The third arms and the fourth arms are arranged in a pattern of alternating positions along a length of the second sidewall stem.

Example 14. The cable duct assembly of Example 13, wherein at least one of the first rounded outer lobe portions include a first radius, wherein the first arms include a rounded inner lobe portion, and wherein the rounded inner lobe portion includes a second radius. The first radius is greater than the second radius. At least one of the first and second lobe mechanisms further include a detent step defined intermediate the rounded outer lobe portion and the rounded inner lobe portion, the detent step configured to prevent over-rotation of the cover plate relative to the first arms beyond an angular limit.

Example 15. The cable duct assembly of Example 13, wherein the first saddle socket includes a first saddle channel defined between a first flange and a second flange.

Example 16. The cable duct assembly of Example 15, further including a guide ramp that extends from the second flange. The guide ramp is configured to align at least one of the first arms or second arms for insertion into the first saddle socket.

Example 17. The cable duct assembly of Example 16, wherein the first flange includes a cover hook portion configured to extend to the first saddle channel. At least one of the first rounded outer lobe portions includes a first radius. The first arms include a rounded inner lobe portion that includes a second radius. The first radius is greater than the second radius. At least one of the first lobe mechanisms further include a detent step defined intermediate the rounded outer lobe portion and the rounded inner lobe portion. The detent step prevents over-rotation of the cover plate relative to the first arms beyond an angular limit. The second flange further includes a socket projection configured to engage the detent step.

Example 18. The cable duct assembly of Example 17, wherein the first rotation limiters are generally C-shaped, having a front jaw and a rear jaw that define a recess therebetween. The front jaw is configured for receipt into the first saddle channel with the recess configured to receive the cover hook portion therein. The first rotation limiters are configured to engage the first saddle socket at the cover hook portion to limit rotation of the first saddle socket relative to the first rotation limiters.

Example 19. A cable duct assembly that defines a passageway for retaining an elongated cable. The cable duct assembly includes a cover plate, a base plate, a first sidewall, and a second sidewall. The cover plate defines a first saddle socket spaced apart from and generally parallel to a second saddle socket. The first saddle socket includes a first flange and a second flange configured to define a first saddle channel therebetween. The second saddle socket includes a third flange and a fourth flange configured to define a second saddle channel therebetween. The first flange further includes a first cover hook portion configured to extend to the first saddle channel and the third flange further includes a second cover hook portion configured to extend to the second saddle channel. The base plate is arranged opposite the cover plate. The base plate defines a first sidewall connector and a second sidewall connector that is spaced apart from and generally parallel to the first sidewall connector.

The first sidewall connects between the base plate and the cover plate. The first sidewall includes a first sidewall stem, a plurality of first arms configured to extend from the first sidewall stem to first arm ends, and a plurality of second arms configured to extend from the first sidewall stem to second arm ends. The first sidewall stem is configured to be received into the first sidewall connector. The first arm ends include first lobe mechanisms that include first rounded outer lobe portions configured to rotatably engage the first saddle socket and that releasably secure the cover plate to the first sidewall. The second arm ends include first rotation limiters that include first catch portions configured to engage the first saddle socket and limit rotation of the first saddle socket relative to the first rotation limiters.

The second sidewall is configured to connect between the base plate and the cover plate. The second sidewall includes a second sidewall stem, a plurality of third arms configured to extend from the second sidewall stem to third arm ends, and a plurality of fourth aims configured to extend from the second sidewall stem to fourth arm ends. The second sidewall stem is configured to be received into the second sidewall connector. The third arm ends include second lobe mechanisms that include second rounded outer lobe portions configured to rotatably engage the second saddle socket and releasably secure the cover plate to the second sidewall. The fourth arm ends include second rotation limiters that include second catch portions configured to engage the second saddle socket and limit rotation of the second saddle socket relative to the second rotation limiters.

Example 20. The cable duct assembly of Example 19, wherein at least one of the first and second rotation limiters is generally C-shaped and include a front jaw and a rear jaw that define a recess therebetween, the front jaw configured to be received into the respective saddle channel, the recess configured to receive the respective cover hook portion therein, the first rotation limiter configured to engage the first saddle channel at the first cover hook portion to limit rotation of the first saddle socket relative to the first rotation limiters, and the second rotation limiter configured to engage the second saddle channel at the second cover hook portion to limit rotation of the second saddle socket relative to the second rotation limiters.

While cable duct assemblies have been described in terms of the preferred embodiments thereof, it is not intended to be so limited, but rather only to the extent set forth in the claims that follow. Moreover, the use of the terms first, second, third, fourth, upper, lower, etc. does not denote any order of importance or orientation, but rather the terms first, second, third, fourth, upper, lower, etc. are used to distinguish one element from another. The use of "e.g.," "etc.," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a wall nodule" includes two or more such wall nodules, and the like. The use of "optionally," "alternatively," and grammatically related terms means that the subsequently described element, event or circumstance may or may not be present/occur, and that the description includes instances where said element, event or circumstance occurs and instances where it does not. Words of approximation (e.g., "substantially," "generally"), as used in context of the specification and figures, are intended to take on their ordinary and customary meanings which denote approximation, unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The description and the referenced drawings provide illustrative examples of that which the inventor(s) regard as their invention. As such, the embodiments discussed herein are merely exemplary in nature and are not intended to limit the scope of the invention, or its protection, in any manner Rather, the description and illustration of these embodiments serve to enable a person of ordinary skill in the relevant art to practice the techniques and apparatuses disclosed herein. While various embodiments of the disclosure are described in the foregoing description and are illustrated in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A device comprising:
   a cover plate, the cover plate defining a first saddle socket spaced apart from a second saddle socket;
   a base plate arranged opposite the cover plate, the base plate defining a first sidewall connector;
   a first sidewall, the first sidewall connecting the base plate and the cover plate, the first sidewall comprising:
   a first sidewall stem, the first sidewall stem received into the first sidewall connector;
   at least one first arm extending from the first sidewall stem to a first arm end;
   at least one second arm extending from the first sidewall stem to a second arm end, the at least one first arm and the at least one second arm are different; and
   a second sidewall, the second sidewall connecting the base plate and the cover plate.

2. The device of claim 1, wherein the at least one first arm comprises a plurality of first arms, and wherein the at least one second arm comprises a plurality of second arms.

3. The device of claim 1, wherein the first arm end comprises a first lobe mechanism, the first lobe mechanism comprising:
   a first rounded outer lobe portion rotatably engaging the first saddle socket and releasably securing the cover plate to the first sidewall.

4. The device of claim 1, wherein the second arm end comprises a first rotation limiter, the first rotation limiter comprising:
   a first catch portion engaging the first saddle socket and limiting rotation of the first saddle socket relative to the first rotation limiter;
   a front jaw;
   a rear jaw; and
   a recess defined between the front jaw and the rear jaw.

5. The device of claim 4,
   wherein the first saddle socket comprises a first saddle channel defined between a first flange and a second flange,
   wherein the first flange further comprises a cover hook portion, the cover hook portion extending to the first saddle channel,
   wherein the first rotation limiter is generally C-shaped,
   wherein the front jaw is configured for receipt into the first saddle channel with the recess receiving the cover hook portion, and
   wherein the first rotation limiter is configured for engaging the first saddle socket at the cover hook portion to limit rotation of the first saddle socket relative to the first rotation limiter.

6. The device of claim 1, wherein the base plate further defines a second sidewall connector spaced apart from the first sidewall connector, wherein the second sidewall further comprises:
   a second sidewall stem, the second sidewall stem received into the second sidewall connector;
   at least one third arm extending from the second sidewall stem to a third arm end, the third arm end comprising a second lobe mechanism, the second lobe mechanism comprising a second rounded outer lobe portion rotatably engaging the second saddle socket and releasably securing the cover plate to the second sidewall; and
   at least one fourth arm extending from the second sidewall stem to a fourth arm end, the fourth arm end comprising a second rotation limiter, the second rotation limiter comprising a second catch portion engaging the second saddle socket and limiting rotation of the second saddle socket relative to the second rotation limiter.

7. The device of claim 6, comprising:
   a plurality of first arms, second arms, third arms, and fourth arms,
   wherein the first arms and the second arms are arranged in a pattern of alternating positions along a length of the first sidewall stem, and wherein the third arms and the fourth arms are arranged in a pattern of alternating positions along a length of the second sidewall stem.

8. The device of claim 6,
   wherein the first arm end comprises a first lobe mechanism, the first lobe mechanism comprising a first rounded outer lobe portion rotatably engaging the first saddle socket and releasably securing the cover plate to the first sidewall;
   wherein the first rounded outer lobe portion comprises a first radius;
   wherein the first arm further comprises a rounded inner lobe portion;
   wherein the rounded inner lobe portion comprises a second radius;
   wherein the first radius is greater than the second radius; and
   wherein the second lobe mechanism further comprises a detent step defined intermediate the first rounded outer lobe portion and the rounded inner lobe portion, the detent step configured for preventing over-rotation of the cover plate relative to the third arm beyond an angular limit.

9. The device of claim 6, wherein the third arm and the fourth arm are different.

10. The device of claim 9, wherein the first arm and the third arm are identical, and wherein the second arm and the fourth arm are identical.

11. The device of claim 1, further comprising a nodule, the nodule extending from an inside surface of the first sidewall, the nodule configured for receipt into an upper portion of the first sidewall connector.

12. The device of claim 1,
    wherein the first arm end comprises a first lobe mechanism, the first lobe mechanism comprising a first rounded outer lobe portion rotatably engaging the first saddle socket and releasably securing the cover plate to the first sidewall;
    wherein the first arm further comprises a rounded inner lobe portion;
    wherein the first rounded outer lobe portion comprises a first radius and the rounded inner lobe portion comprises a second radius;
    wherein the first radius is greater than the second radius; and
    wherein at least one of the first lobe mechanisms further comprises a detent step defined intermediate the first rounded outer lobe portion and the rounded inner lobe portion.

13. The device of claim 1, wherein the first saddle socket comprises a first saddle channel defined between a first flange and a second flange.

14. The device of claim 13, further comprising a guide ramp extending from the second flange, the guide ramp aligning at the first arm or the second arm for insertion into the first saddle socket.

15. The device of claim 13, wherein the first flange further comprises a cover hook portion, the cover hook portion extending to the first saddle channel.

16. The device of claim 15,
wherein the first arm end comprises a first lobe mechanism, the first lobe mechanism comprising a first rounded outer lobe portion rotatably engaging the first saddle socket and releasably securing the cover plate to the first sidewall;
wherein at least one of the first rounded outer lobe portions comprise a first radius;
wherein the first arm comprises a rounded inner lobe portion;
wherein the rounded inner lobe portion comprises a second radius;
wherein the first radius is greater than the second radius;
wherein the first lobe mechanism further comprises a detent step defined intermediate the first rounded outer lobe portion and the rounded inner lobe portion;
wherein the detent step is configured for preventing over-rotation of the cover plate relative to the first arm beyond an angular limit; and
wherein the second flange further comprises a socket projection engaging the detent step.

17. The device of claim 1,
wherein the cover plate, the base plate, the first sidewall, and the second sidewall define a passageway therebetween, the passageway configured for retaining an elongated cable;
wherein the second arm further comprises a deflector portion extending into the passageway; and
wherein when the device is mounted in a horizontal orientation, the deflector portion receives a load from the elongated cable and transfers the load to the cover plate.

18. The device of claim 1,
wherein the cover plate, the base plate, the first sidewall, and the second sidewall define a passageway therebetween, the passageway configured for retaining an elongated cable;
wherein the first sidewall hingedly connects with the cover plate at a first side through a first hinge mechanism;
wherein the second sidewall hingedly connects with the cover plate at a second side through a second hinge mechanism; and
wherein when the device is mounted in a horizontal orientation with the first sidewall mounted below the second sidewall, the first sidewall is configured to receive a load from the elongated cable and the cover plate, the base plate, the first sidewall, and the second sidewall move as a four-bar linkage, with rotation at a first hinge mechanism and a second hinge mechanism and a pivotal movement at a first pivot connection and a second pivot connection.

19. The device of claim 18, wherein pivotal movement at the first pivot connection causes a snap reinforcement of a sidewall stem to contact an inner locking flange, thereby locking the sidewall stem within the first sidewall connector of the base plate.

20. The device of claim 1, wherein the base plate further comprises:
an inner base rail spaced apart from an outer base rail to define an open-ended locking channel that is configured for receiving a sidewall stem of a sidewall therein; and
a base extension that extends past a distal side of the first sidewall connector, the base extension configured to stiffen the outer base rail in relation to the base plate, thereby preventing the outer base rail from rotating about an edge of the base plate.

21. The device of claim 1, wherein the first arms and the second arms are arranged in a pattern of alternating positions along a length of the first sidewall stem.

* * * * *